US008441546B2

(12) United States Patent
Higuchi

(10) Patent No.: US 8,441,546 B2
(45) Date of Patent: May 14, 2013

(54) IMAGE PROCESSING DEVICE AND IMAGE PROCESSING PROGRAM

(75) Inventor: Keiji Higuchi, Kunitachi (JP)

(73) Assignee: Olympus Corporation (JP)

( * ) Notice: Subject to any disclaimer, the term of this patent is extended or adjusted under 35 U.S.C. 154(b) by 209 days.

(21) Appl. No.: 12/851,658

(22) Filed: Aug. 6, 2010

(65) Prior Publication Data
US 2010/0295975 A1 Nov. 25, 2010

Related U.S. Application Data

(63) Continuation of application No. PCT/JP2008/073117, filed on Dec. 18, 2008.

(30) Foreign Application Priority Data

Feb. 7, 2008 (JP) .................................. 2008-027815

(51) Int. Cl.
H04N 9/045 (2011.01)
H04N 5/367 (2011.01)
H04N 5/361 (2011.01)
G06T 5/001 (2006.01)
G06T 5/40 (2006.01)

(52) U.S. Cl.
USPC ........ 348/222.1; 348/246; 348/241; 382/275; 382/274; 382/254

(58) Field of Classification Search .................. 348/246, 348/245, 248, 247, 615, 652, 606, 243, 241, 348/222.1; 382/275, 274, 254, 264, 266, 382/262, 162–167
See application file for complete search history.

(56) References Cited

U.S. PATENT DOCUMENTS

| 7,567,278 | B2 * | 7/2009 | Yoneda .......................... 348/246 |
| 2006/0012694 | A1 * | 1/2006 | Yoneda et al. ................ 348/246 |
| 2006/0045333 | A1 | 3/2006 | Wu et al. |
| 2006/0238629 | A1 * | 10/2006 | Sato et al. ..................... 348/241 |

(Continued)

FOREIGN PATENT DOCUMENTS

| EP | 1 578 138 | 9/2005 |
| EP | 1 764 738 | 3/2007 |

(Continued)

OTHER PUBLICATIONS

International Preliminary Examination Report on Patentability issued Oct. 14, 2010 in corresponding International Application No. PCT/JP2008/073117.

(Continued)

Primary Examiner — Nhan T Tran
Assistant Examiner — Marly Camargo
(74) Attorney, Agent, or Firm — Ostrolenk Faber LLP

(57) ABSTRACT

A device includes a first isolated-point candidate detection section calculates a parameter value used for detecting an isolated-point candidate from a near-field region of a target pixel of a color image signal, a color-space conversion section combines a plurality of signals constituting the color image signal together, and converts the combined signals into a plurality of color signals on defined color space, a second isolated-point candidate detection section calculates a parameter value used for detecting an isolated-point candidate from a near-field region of a target pixel of the converted color signal, and an isolated-point degree determination section determines an isolated-point degree on the basis of parameter values calculated by the isolated-point candidate detection sections.

10 Claims, 16 Drawing Sheets

U.S. PATENT DOCUMENTS

| | | | |
|---|---|---|---|
| 2006/0257046 A1* | 11/2006 | Rai et al. | 382/275 |
| 2007/0165124 A1* | 7/2007 | Richardson | 348/294 |
| 2008/0239112 A1* | 10/2008 | Naito | 348/246 |
| 2008/0273102 A1* | 11/2008 | Hyakutake et al. | 348/246 |
| 2010/0215266 A1* | 8/2010 | Higuchi | 382/167 |

FOREIGN PATENT DOCUMENTS

| | | |
|---|---|---|
| EP | 1 860 611 | 11/2007 |
| JP | 2001-307079 | 11/2001 |
| JP | 2002-10274 | 1/2002 |
| JP | 2002-237997 | 8/2002 |
| JP | 2004-207896 | 7/2004 |
| JP | 2006-74734 | 3/2006 |
| JP | 2008-301481 | 12/2008 |
| WO | WO 2007/075065 | 7/2007 |

OTHER PUBLICATIONS

International Search Report and Written Opinion mailed Apr. 7, 2009 in corresponding PCT International Application No. PCT/JP2008/073117.

Search Report issued by European Patent Office and received by applicant on Nov. 2, 2012 in connection with corresponding EP patent application No. EP 08 87 2102.

* cited by examiner

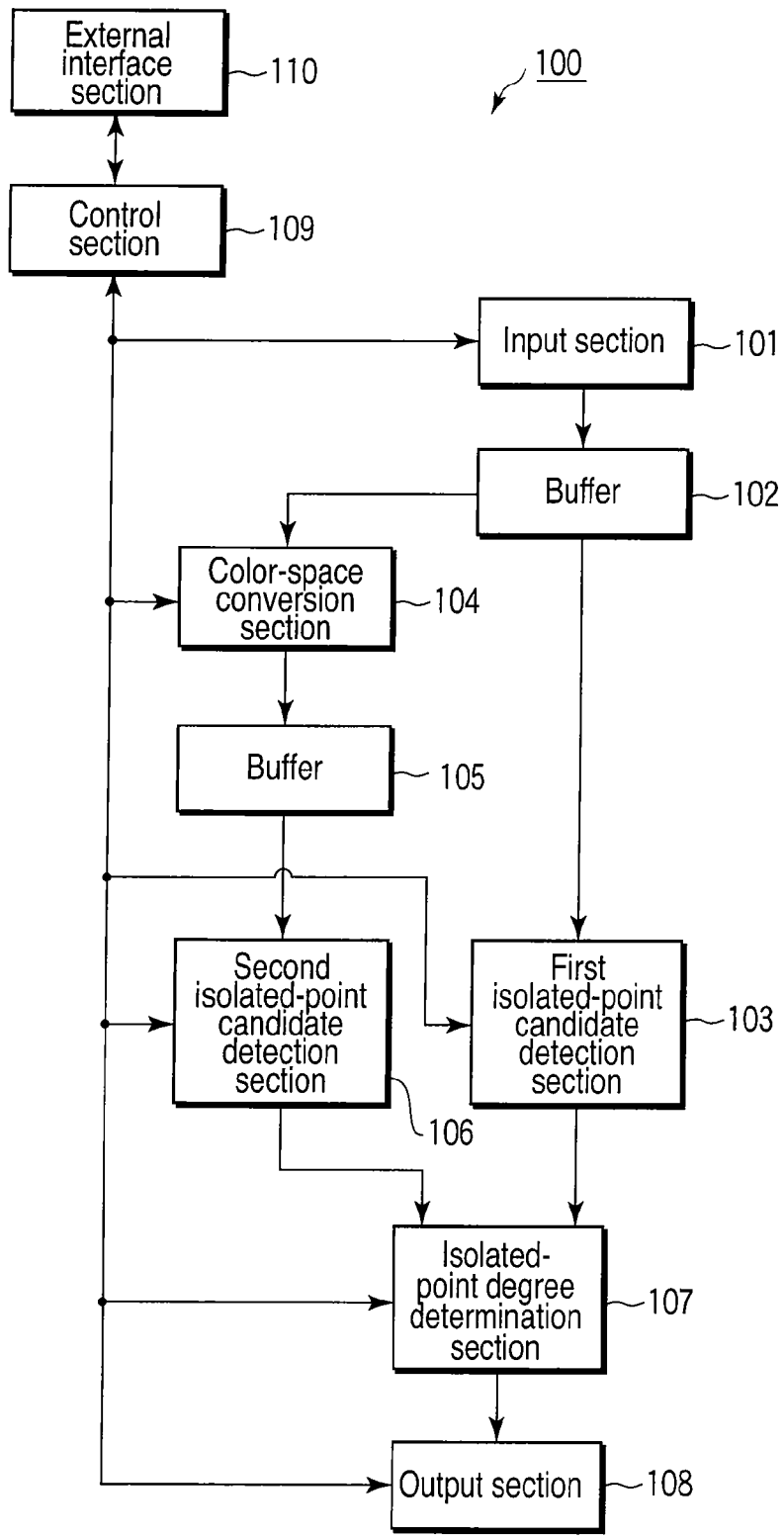
F I G. 1

| R11 | G12 | R13 | G14 | R15 |
|---|---|---|---|---|
| G21 | B22 | G23 | B24 | G25 |
| R31 | G32 | R33 | G34 | R35 |
| G41 | B42 | G43 | B44 | G45 |
| R51 | G52 | R53 | G54 | R55 |

F I G. 2

| Y11 | Y12 | Y13 | Y14 |
|---|---|---|---|
| Y21 | Y22 | Y23 | Y24 |
| Y31 | Y32 | Y33 | Y34 |
| Y41 | Y42 | Y43 | Y44 |

F I G. 3A

| Cb11 | Cb12 | Cb13 | Cb14 |
|---|---|---|---|
| Cb21 | Cb22 | Cb23 | Cb24 |
| Cb31 | Cb32 | Cb33 | Cb34 |
| Cb41 | Cb42 | Cb43 | Cb44 |

F I G. 3B

| Cr11 | Cr12 | Cr13 | Cr14 |
| --- | --- | --- | --- |
| Cr21 | Cr22 | Cr23 | Cr24 |
| Cr31 | Cr32 | Cr33 | Cr34 |
| Cr41 | Cr42 | Cr43 | Cr44 |

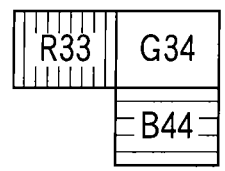
F I G. 10H
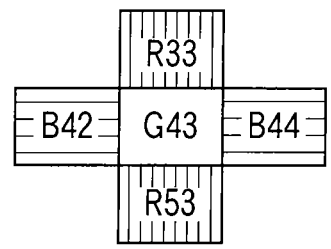
F I G. 11

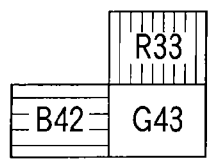
F I G. 12A
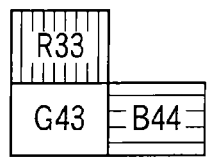
F I G. 12B
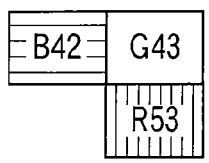
F I G. 12C
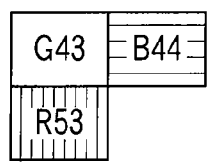
F I G. 12D

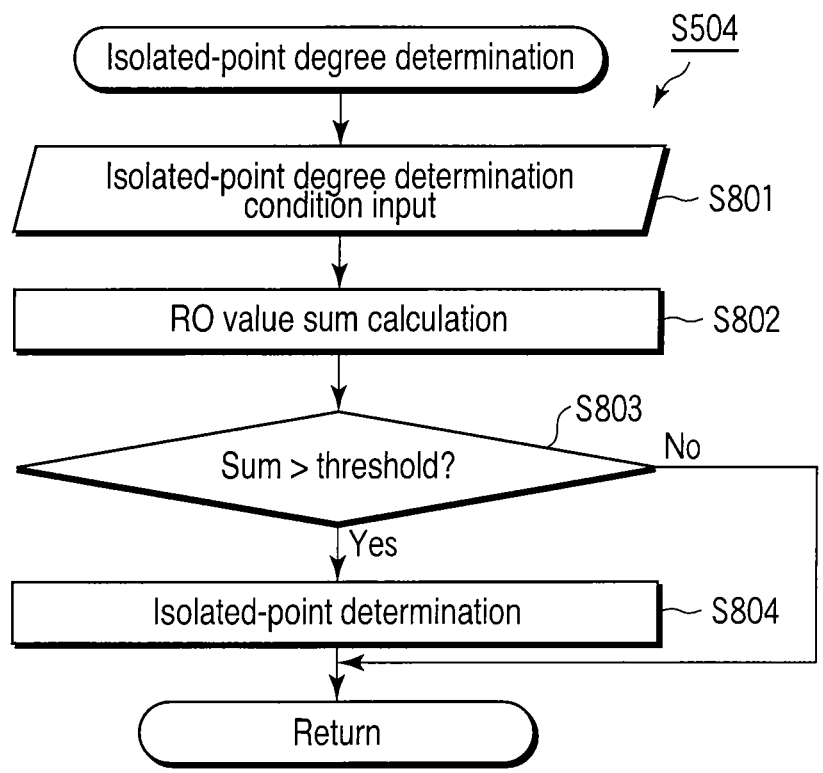
F I G. 18

IMAGE PROCESSING DEVICE AND IMAGE PROCESSING PROGRAM

CROSS REFERENCE TO RELATED APPLICATIONS

This is a Continuation Application of PCT Application No. PCT/JP2008/073117, filed Dec. 18, 2008, which was published under PCT Article 21(2) in Japanese.

This application is based upon and claims the benefit of priority from prior Japanese Patent Application No. 2008-027815, filed Feb. 7, 2008, the entire contents of which are incorporated herein by reference.

BACKGROUND OF THE INVENTION

1. Field of the Invention

The present invention relates to an image processing device and image processing program suitable to subject a color image signal to isolated-point determination.

2. Description of the Related Art

Heretofore, although a number of methods for detecting a defect of an image signal have been proposed, in such signal processing, a defective pixel is basically detected and corrected on the basis of pixel information of the same color. As an example, a method of detecting a defect of a target pixel by using an adjacent pixel of the same color is proposed. (Pat. Document 1)

Further, as another example, a method of extracting color components from three pixels adjacent to each other, detecting a defect from the degree of a difference in the diagonal direction, and correcting the detected defect is proposed. (Pat. Document 2)

Pat. Document 1: Jpn. Pat. Appln. KOKAI Publication No. 2001-307079

Pat. Document 2: Jpn. Pat. Appln. KOKAI Publication No. 2002-010274

BRIEF SUMMARY OF THE INVENTION

Including the techniques described in Pat. Documents 1 and 2, when a defective pixel is to be detected and corrected on the basis of pixel information of the same color, in, for example, an image signal input from a Bayer type single color filter, even pixels of the same color closest to each other are separate from each other by a distance corresponding to two pixels. For example, there is a drawback that when a defective pixel is present at an edge part of an image, if it is attempted to detect a defect by using pixels at positions separate from each other by a distance corresponding to two pixels, the detection accuracy is lowered.

The present invention has been contrived in consideration of these circumstances, and an object thereof is to provide an image processing device and image processing program capable of carrying out defective pixel detection with a higher degree of accuracy.

An aspect of the present invention is characterized by comprising: a plurality of isolated-point candidate detection sections configured to calculate a parameter value used for detecting an isolated-point candidate in a color image signal; and an isolated-point degree determination section configured to determine an isolated-point degree on the basis of parameter values calculated by the plurality of isolated-point candidate detection sections.

Another aspect of the present invention is an image processing device configured to process a color image signal input from a single-chip imaging system, and is characterized by comprising: a color-component extraction section configured to extract a color component from the image signal, that is, from a target pixel itself, and a near-field region of a color different from the target pixel; a color-component isolated-point degree calculation section configured to calculate a first parameter value used for detecting an isolated point from the extracted color component; an identical-color isolated-point degree calculation section configured to calculate a second parameter value used for detecting an isolated point from the input image signal, that is, from the target pixel itself, and a near-field region of a color identical with the target pixel; and a color-component isolated-point degree determination section configured to determine the isolated-point degree in accordance with the calculated first and second parameter values.

BRIEF DESCRIPTION OF THE SEVERAL VIEWS OF THE DRAWING

FIG. 1 is a block diagram showing the circuit configuration of an image processing device according to a first embodiment of the present invention.

FIG. 2 is a view exemplifying the pixel configuration of the RGB primary-color system Bayer arrangement.

FIG. 3A is a view exemplifying the pixel configuration of a luminance signal and chrominance signal after being subjected to color space conversion according to the first embodiment.

FIG. 3B is a view exemplifying the pixel configuration of a luminance signal and chrominance signal after being subjected to color space conversion according to the first embodiment.

FIG. 10H is a view showing a selection pattern of peripheral pixels for a target pixel according to the second embodiment.

FIG. 11 is a view showing a selection pattern of peripheral pixels for a target pixel according to the second embodiment.

FIG. 12A is a view showing a selection pattern of peripheral pixels for a target pixel according to the second embodiment.

FIG. 12B is a view showing a selection pattern of peripheral pixels for a target pixel according to the second embodiment.

FIG. 12C is a view showing a selection pattern of peripheral pixels for a target pixel according to the second embodiment.

FIG. 12D is a view showing a selection pattern of peripheral pixels for a target pixel according to the second embodiment.

FIG. 18 is a flowchart showing the processing contents of an isolated-point degree determination subroutine of FIG. 15 according to the second embodiment.

DETAILED DESCRIPTION OF THE INVENTION

First Embodiment

Figures 3C, 4:
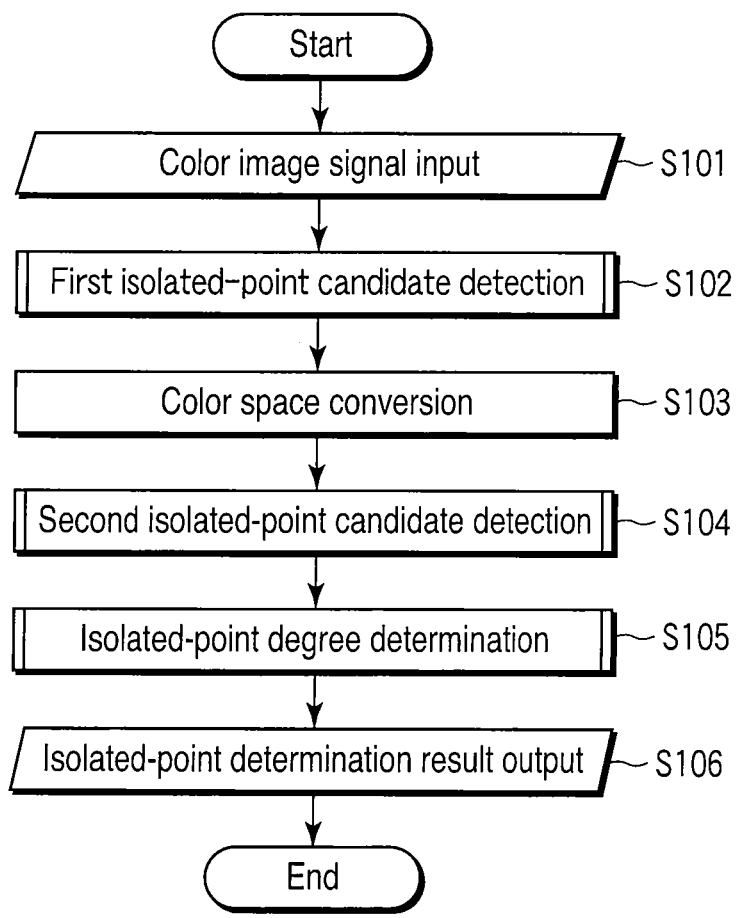
FIG. 3C is a view exemplifying the pixel configuration of a luminance signal and chrominance signal after being subjected to color space conversion according to the first embodiment.
FIG. 4 is a flowchart showing a main routine of the image processing according to the first embodiment.

A first embodiment in which the present invention is applied to an image processing device incorporated in a digital still camera will be described below with reference to the drawings.

FIG. 1 is a block diagram showing the circuit configuration of an image processing device 100 according to this embodiment. In FIG. 1, a digitized color image signal from an imaging system (not shown) is input to an input section 101. Here, the color image signal to be input is assumed to be a single-chip image constituted of red, green, and blue of the Bayer arrangement. The image signal input to the input section 101 is sent to a first isolated-point candidate detection section 103 and color-space conversion section 104 through a buffer 102.

The first isolated-point candidate detection section 103 detects an isolated-point candidate on the basis of an image signal from the buffer 102, and outputs the detected isolated-point candidate to an isolated-point degree determination section 107.

On the other hand, the color-space conversion section 104 converts the color space accompanying all-pixel interpolation with respect to the image signal from the buffer 102, and sends the converted color space to a second isolated-point candidate detection section 106 through a buffer 105. Here, the color space obtained after the conversion is assumed to be luminance (Y) signals and chrominance (Cb, Cr) signals.

The second isolated-point candidate detection section 106 detects an isolated-point candidate on the basis of the image signal obtained after the color space conversion supplied thereto through the buffer 105, and outputs the detected isolated-point candidate to the isolated-point degree determination section 107.

The isolated-point degree determination section 107 determines the degree of the isolated point on the basis of the isolated-point candidate detected by the second isolated-point candidate detection section 106, and outputs a determination result to an output section 108 as isolated-point determination information.

The output section 108 outputs the isolated-point determination information from the isolated-point degree determination section 107 to, for example, a defective pixel correction section (not shown), thereby causing the defective pixel correction section to execute defective pixel correction of the isolated point for the image signal.

A control section 109 carries out operation control of each of the above circuits in a unifying manner. The control section 109 is constituted of, for example, a one-chip microcomputer or the like, and is bidirectionally connected to the input section 101, first isolated-point candidate detection section 103, color-space conversion section 104, second isolated-point candidate detection section 106, isolated-point degree determination section 107, and output section 108.

Furthermore, an external interface section 110 is bidirectionally connected to the control section 109. The external interface section 110 includes a power-supply switch, and interface mechanism configured to carry out switching of threshold setting which are not shown.

The control section 109 executes in advance setting of input conditions such as a image size, threshold, and the like through the external interface section 110 before inputting a color image signal to the input section 101.

Next, an operation of the embodiment will be described below.

The color image signal input from the input section 101 is sent to the first isolated-point candidate detection section 103 and color-space conversion section 104 through the buffer 102.

Here, an example of isolated-point candidate detection at the first isolated-point candidate detection section 103 will be described below by using FIG. 2.

FIG. 2 shows pixels of the Bayer arrangement. A single-chip solid-state image sensing device (not shown) in the imaging system has a color filter of the Bayer arrangement, and hence such a color image signal is input.

In the first isolated-point candidate detection section 103, peripheral pixels of the target pixel are selected. In FIG. 2, it is assumed that the target pixel is, for example, R33 in the center, and the peripheral pixels are those pixels each separated from R33 by a pixel in the upward, downward, rightward, leftward, and diagonal directions, and having the identical color. Then, the peripheral pixels in FIG. 2 are R11, R13, R15, R31, R35, R51, R53, and R55.

Further, it is also possible to define eight pixels adjacent to the target pixel having no identical color as the peripheral pixels. In that case, the pixels peripheral to the target pixel are B22, G23, B24, G32, G34, B42, G43, and B44.

It is assumed that in the first isolated-point candidate detection section 103, parameter values are calculated by using the rank order, and firstly absolute values of differences between the target pixel and peripheral pixels are calculated. Then, the absolute values are summed with respect to half the number of the peripheral pixels from the pixel having the smallest absolute value of the calculated difference. In FIG. 2, the number of the peripheral pixels is eight, and thus four absolute values are summed from that having the smallest absolute value of the difference. Further, the summed value is made the parameter value of the isolated-point candidate detection of the target pixel.

Next, an example of color-space conversion at the color-space conversion section 104 on the one side will be described below.

In the color-space conversion section 104, the RBG system image signal is converted into luminance signals and chrominance signals accompanied by all-pixel interpolation by using a block corresponding to a total of four pixels constituted of two adjoining pixels in the longitudinal direction× two adjoining pixels in the lateral direction of the input image signal as one unit.

FIGS. 3A to 3C show luminance signals Y (FIG. 3A), and chrominance signals Cb, and Cr (FIGS. 3B and 3C) produced by converting the color space of FIG. 2.

The color space of FIG. 2 is converted into the luminance signals Y, and two types of chrominance signals Cb and Cr which are subjected to the all-pixel interpolation by using all the blocks each corresponding to a total of four pixels constituted of two pixels in the longitudinal direction×two pixels in the lateral direction in such a manner that for example, the four pixels R11, G12, G21, and B22 in FIG. 2 are converted into the luminance signal Y11 shown in FIG. 3A, and two chrominance signals Cr11 and Cb11 by a matrix operation, further the four pixels G12, R13, B22, and G23 are converted into the luminance signal Y12, and two chrominance signals Cr12 and Cb12 by a matrix operation, and so on.

As a result of this, a pseudo-triple-chip image signal of the luminance chrominance system having the pixel-number configuration in which each of the number of columns or number of rows is less than that of the input image signal by one is produced.

Next, an example of isolated-point candidate detection to be executed by the second isolated-point candidate detection section 106 with respect to the color-space-converted luminance, and chrominance signals will be described below.

The second isolated-point candidate detection section 106 selects peripheral pixels of the target pixel. For example, when the target pixel in FIG. 3A is assumed to be Y22 with respect to, for example the luminance signals Y, eight pixels around and adjacent to the target pixel are selected as the peripheral pixels. That is, in FIG. 3A, Y11, Y12, Y13, Y21, Y23, Y31, Y32, and Y33 become the peripheral pixels for the target pixel Y22.

The second isolated-point candidate detection section 106 is assumed to calculate the parameter value by using the rank order, and firstly absolute values of differences between the target pixel and peripheral pixels are calculated. Then, the absolute values are summed with respect to half the number of the peripheral pixels from the pixel having the smallest absolute value of the calculated difference. In FIG. 3A, the number of the peripheral pixels is eight, and hence four absolute values are summed from that having the smallest absolute value of the difference. Further, the summed value is made the parameter value of the isolated-point candidate detection of the target pixel.

Here, although the description has been given by taking the luminance signals Y of FIG. 3A as an example, the second isolated-point candidate detection section 106 calculates the parameter values of the isolated-point candidate detection also with respect to the chrominance signals Cb and Cr shown in FIGS. 3B and 3C in the same manner.

However, the isolated-point degree determination section 107 carries out determination of the isolated-point degree by using the parameter value of the isolated-point candidate detection based on the original image signal calculated by the first isolated-point candidate detection section 103, and the parameter value of the isolated-point candidate detection based on the image signal obtained after the color space conversion calculated by the second isolated-point candidate detection section 106.

In an example of the determination of the isolated-point degree to be executed by the isolated-point degree determination section 107, when the parameter values detected by the first isolated-point candidate detection section 103 are greater than or equal to a predetermined threshold, and one or more than one of the parameter values detected by the second isolated-point candidate detection section 106 are larger than the predetermined threshold, it is determined that the corresponding target pixel is an isolated point. Further, the information on determining whether or not the target pixel is the isolated point is output to the output section 108.

Further, as another example, when the parameter values detected by the first isolated-point candidate detection section 103 are greater than or equal the predetermined threshold, the isolated-point degree determination section 107 outputs the total of the three parameter values detected by the second isolated-point candidate detection section 106 to the output section 108 as the isolated-point degree.

As still another example, when the parameter values detected by the first isolated-point candidate detection section 103 are equal to or larger than the predetermined threshold, the isolated-point degree determination section 107 outputs the total of the parameter values from the second isolated-point candidate detection section 106 calculated from the pixels of a chrominance signal converted by using the target pixel to the output section 108 as the isolated-point degree.

For example, when the target pixel of FIG. 2 is assumed to be R33, the pixels of the chrominance signal converted by using R33 are the pixels Y33, Y43, Y43, and Y44 shown in FIG. 3A, and hence when the parameter value of the target pixel R33 is greater than or equal to the threshold, the total of the parameter values of the luminance signals Y33, Y34, Y43, and Y44 is output to the output section 108 as the isolated-point degree.

At the output section 108 of the final stage, the isolated-point determination information from the isolated-point degree determination section 107 is output to a processing circuit (not shown) or the like of the next stage, whereby it is possible to carry out processing, for example, defective pixel correction or the like.

It should be noted that in this embodiment, although the description has been given on the assumption that the image signal input to the input section 101 is a color image signal of the RGB Bayer arrangement obtained by a single-chip solid-state image sensing device, the present invention is not to limit the number of chips of the solid-state image sensing devices provided in the imaging system, or pixel arrangement or the like of the color image signal.

Further, in this embodiment, although the example in which the primary-color system color image signal is converted into the luminance signals and chrominance signals by the color space conversion has been shown, the embodiment is not limited to the color space conversion, and the color image signal may also be converted into an image signal of the other color space.

Furthermore, in this embodiment, although it is assumed that the two systems including the isolated-point candidate detection sections 103 and 106 are used, the isolated-point candidate detection sections may also have three or more systems (at least plural systems). For example, the isolated-point degree determination may be carried out on the basis of the isolated-point candidate detection result of a total of three systems obtained by adding a system configured to convert the Lab color space by the color space conversion with respect to the original image, and carry out the isolated-point candidate detection to the two systems of this embodiment.

Further, in this embodiment, although the description has been given on the assumption that each of the isolated-point candidate detection sections 103 and 106 calculates the parameter values by using the rank order, other indicators for measuring the isolated-point degree may also be used. For example, it is also possible to make the absolute value of the difference between the average value of the peripheral pixels, and the target pixel the parameter value.

Furthermore, in the embodiment, although the description has been given on the assumption that the processing is realized by hardware as shown in FIG. 1, it is also possible to realize the image processing by software, and hence the processing contents will be described below.

FIG. 4 shows the contents of the main routine of the software processing to be executed by using a data processor or the like for image processing called in general an image engine or the like.

In FIG. 4, first, when a digital color image signal and header information are input (step S101), the image signal and information are temporarily held, and the input image signal is subjected to first isolated-point candidate detection (step S102).

Figure 5:
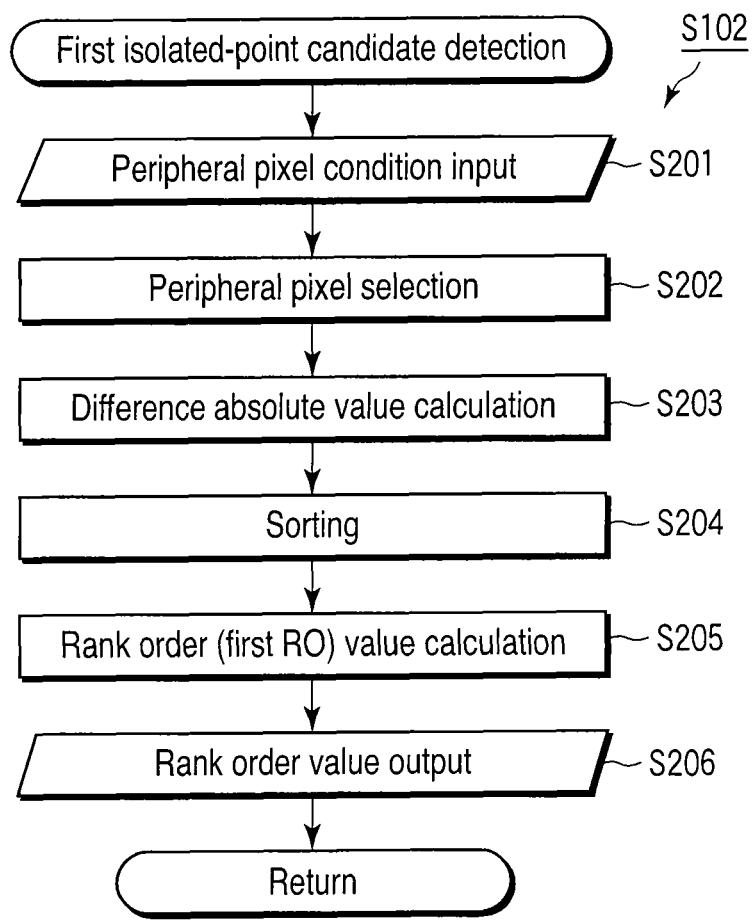
FIG. 5 is a flowchart showing the processing contents of a first isolated-point candidate detection subroutine of FIG. 4 according to the first embodiment.

FIG. 5 shows a subroutine associated with the first isolated-point candidate detection.

At the beginning, when a condition for setting the peripheral pixels is input (step S201), peripheral pixels for the target pixel are selected on the basis of the input peripheral pixel setting condition (step S202).

Then, the absolute values of differences between the target pixel and selected peripheral pixels are calculated (step S203), and the calculated difference absolute values are sorted (step S204).

Thereafter, the difference absolute values are summed with respect to half the number of the difference absolute values from the smallest sorted difference absolute value as the rank order value, that is, when the peripheral pixels selected for the target pixel are eight pixels, the difference absolute values are summed with respect to four pixels, and the resultant value is made the first rank order (RO) value (step S205).

Finally, the calculated first RO value is output as the parameter value of the first isolated-point candidate (step S206). Actually, with respect to each of all the target pixels constituting the input image signal, the processing of the first isolated-point candidate detection is executed in the same manner, whereby the image signal corresponding to one frame is processed. Thus, after the first isolated-point candidate detection is ended, the flow returns to the main routine of FIG. 4.

In the main routine of FIG. 4, after the detection processing of the first isolated-point candidate in step S102, color space conversion is carried out for another input image signal separately held (step S103).

More specifically, as described in connection with FIGS. 3A to 3C, the RBG system image signal is converted into luminance signals and chrominance signals by using a block corresponding to a total of four pixels constituted of two adjoining pixels in the longitudinal direction×two adjoining pixels in the lateral direction of the input image signal as one unit, whereby a pseudo-triple-chip image signal of the luminance chrominance system having the pixel-number configuration in which each of the number of columns or number of rows is less than that of the input image signal by one is produced.

Thereafter, second isolated-point candidate detection is carried out by using the color-space-converted image signal (step S104).

Figure 6:
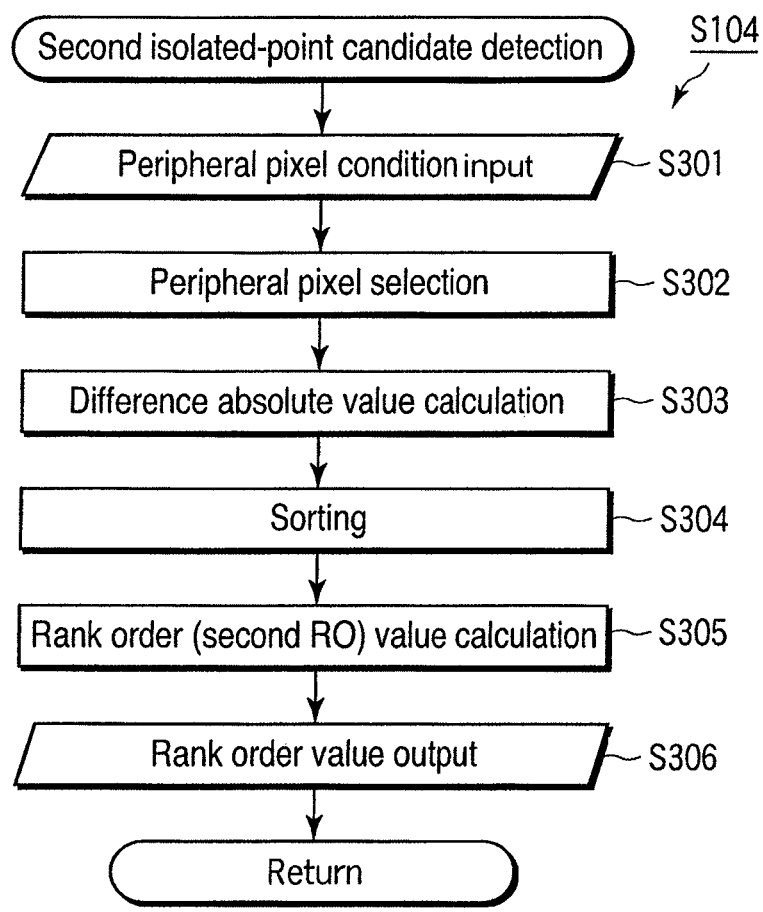
FIG. 6 is a flowchart showing the processing contents of a second isolated-point candidate detection subroutine of FIG. 4 according to the first embodiment.

FIG. 6 is a subroutine associated with the second isolated-point candidate detection.

At the beginning, when a condition for setting the peripheral pixels is input (step S301), peripheral pixels for the target pixel are selected on the basis of the input peripheral pixel setting condition (step S302).

Then, the absolute values of differences between the target pixel and selected peripheral pixels are calculated (step S303), and the calculated difference absolute values are sorted (step S304).

Thereafter, the difference absolute values are summed with respect to half the number of the difference absolute values from the smallest sorted difference absolute value as the rank order value, that is, when the peripheral pixels selected for the target pixel are eight pixels, the difference absolute values are summed with respect to four pixels, and the resultant value is made the second rank order (RO) value (step S305).

Finally, the calculated second RO value is output as the parameter value of the second isolated-point candidate (step S306). Actually, with respect to each of all the target pixels constituting the input image signal, the processing of the second isolated-point candidate detection is executed in the same manner, whereby the image signal corresponding to one frame is processed. Thus, after the second isolated-point candidate detection is ended, the flow returns to the main routine of FIG. 4.

In the main routine of FIG. 4, determination of the isolated-point degree is carried out by using the first isolated-point candidate detected in above step S102, and second isolated-point candidate detected in above step S104 (step S105).

Figure 7:
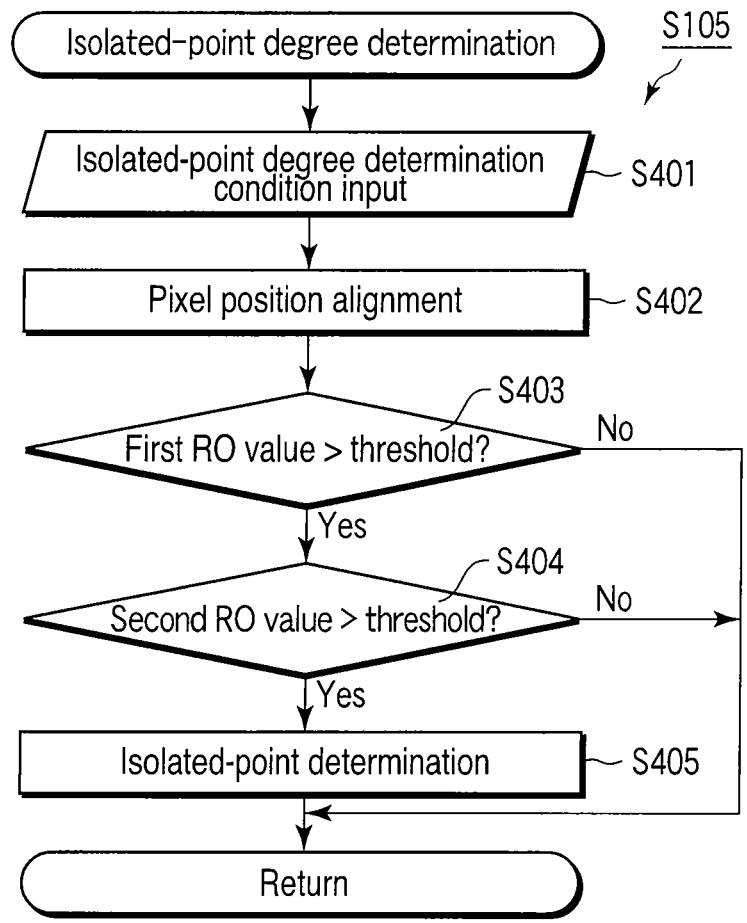
FIG. 7 is a flowchart showing the processing contents of an isolated-point degree determination subroutine of FIG. 4 according to the first embodiment.

FIG. 7 shows a subroutine associated with the isolated-point degree determination.

At the beginning, when a threshold or the like used as a condition for carrying out the isolated-point degree determination is input (step S401), alignment of the first isolated-point candidate, second isolated-point candidate, and pixels with each other is carried out (step S402).

As the determination method, it is first determined at the pixel position whether or not the first RO value is larger than the threshold (step S403).

Here, if it is determined that the first RO value is larger than the threshold, then it is determined whether or not the second RO value is also larger than the threshold (step S404).

If it is determined that the second RO value is also larger than the threshold, then both the first RO value and second RO value are larger than the threshold, and in each of both the original image signal and color space-converted image signal, the isolated-point degree is very high, whereby it is determined that the target pixel is an isolated point (step S405).

Further, if it is determined in step S403 that the first RO value is smaller than the threshold, or if it is determined in step S404 that the second RO value is smaller than the threshold, then it is determined that the isolated-point degree is not so high, and the determination indicating that the target pixel is an isolated point is not carried out.

Actually, with respect to each of all the target pixels constituting the input image signal, the isolated-point degree determination is carried out in the same manner, whereby the image signal corresponding to one frame is processed. Thus, after the isolated-point degree determination is ended, the flow returns to the main routine of FIG. 4.

In the main routine of FIG. 4, information on the positions of the target pixels for which it is determined that they are isolated points is collectively output to a circuit (not shown) of the next stage (step S106), and thus the image processing by the software according to this embodiment is terminated.

As described above in detail, in this embodiment, the isolated-point candidate is detected by the first isolated-point candidate detection section 103 from the input image signal, furthermore, the isolated-point candidate is detected also from the image signal formed by converting the color space of the input image signal, and the final isolated-point degree is determined from the detected isolated-point candidates. Thus, the isolated-point candidates are detected from the plurality of indicators, the detected candidates are unified, and the isolated-point degree is thus determined, whereby it is possible to carry out isolated-point detection of a higher degree of accuracy.

Further, in this embodiment, in detecting an isolated-point candidate from the input image signal, the isolated-point candidate is detected from the peripheral pixels for the target pixel of the image signal. The isolated-point candidate is detected by using the input original image signal as described above, whereby it is possible to carry out defective pixel detection in a state where the original signal is kept as it is.

Furthermore, in this embodiment, with respect to the image signal particularly acquired by imaging using the single-chip solid-state image sensing device having a color filter, the image signal is converted into an image signal of the different color space which has been subjected to all-pixel interpolation for each color, and thereafter the isolated-point candidate is detected by using the target pixel, and adjoining pixels of the interpolated image signal. As described above, by producing the adjoining pixels, and by detecting the defective pixel from the produced adjoining pixels, it is possible to carry out defective pixel detection of a higher degree of accuracy.

Furthermore, in this embodiment, the input image signal is converted into luminance signals and chrominance signals, and the isolated-point candidate is detected from each of the above converted signals, whereby by placing emphasis on the isolated-point candidate detected on the basis of the luminance signal, it is possible to detect an isolated-point candidate more suitable for the human visual characteristics.

Further, in this embodiment, by using the rank order as the parameter value used to detect the isolated-point candidate, it is possible to carry out isolated-point detection of a high degree of accuracy.

Furthermore, in place of the rank order used as the parameter value for detecting the isolated-point candidate described in this embodiment, an average value of pixel values in the near-field region may be used. By obtaining the average value as described above, it is possible to calculate the parameter value at higher speed than the case of using the rank order.

Furthermore, as the parameter value for detecting the isolated-point candidate, an average value of pixel values in the near-field region may be used. In that case, by obtaining the average value, it is possible to calculate the parameter value at higher speed than the case of using the rank order.

Further, in this embodiment, the isolated-point degree is determined on the basis of a plurality of parameter values including the parameter value calculated from the original input image signal, and one or more parameter values calculated from the image signal produced by converting the color space, and hence it is possible to carry out isolated-point detection of a higher degree of accuracy.

Furthermore, in the above embodiment, when the parameter value calculated from the original input image signal is greater than or equal to a certain threshold, and parameter value calculated from the image signal produced by converting the color space is also greater than or equal to the certain threshold, it is determined that the position of the target pixel in question is an isolated point, and hence it is possible to carry out defective pixel detection in which emphasis is placed on the original input image signal information.

Furthermore, in this embodiment, the isolated-point degrees are set like consecutive numbers by totaling the calculated parameter values, and hence when correction is carried out after the isolated-point detection, it is possible to carry out correction of a high degree of flexibility.

Further, in this embodiment, the isolated-point degree is determined on the basis of the parameter value calculated from the original input image signal, and parameter value calculated from the pixel affected by the target pixel due to the color space conversion. As a result of this, by using the pixel obtained after the color space conversion, and affected by the target pixel for the isolated-point determination, it is possible to carry out determination at a more suitable pixel position.

Second Embodiment

A second embodiment in which the present invention is applied to an image processing device incorporated in a digital still camera will be described below with reference to the drawings.

Figure 8:
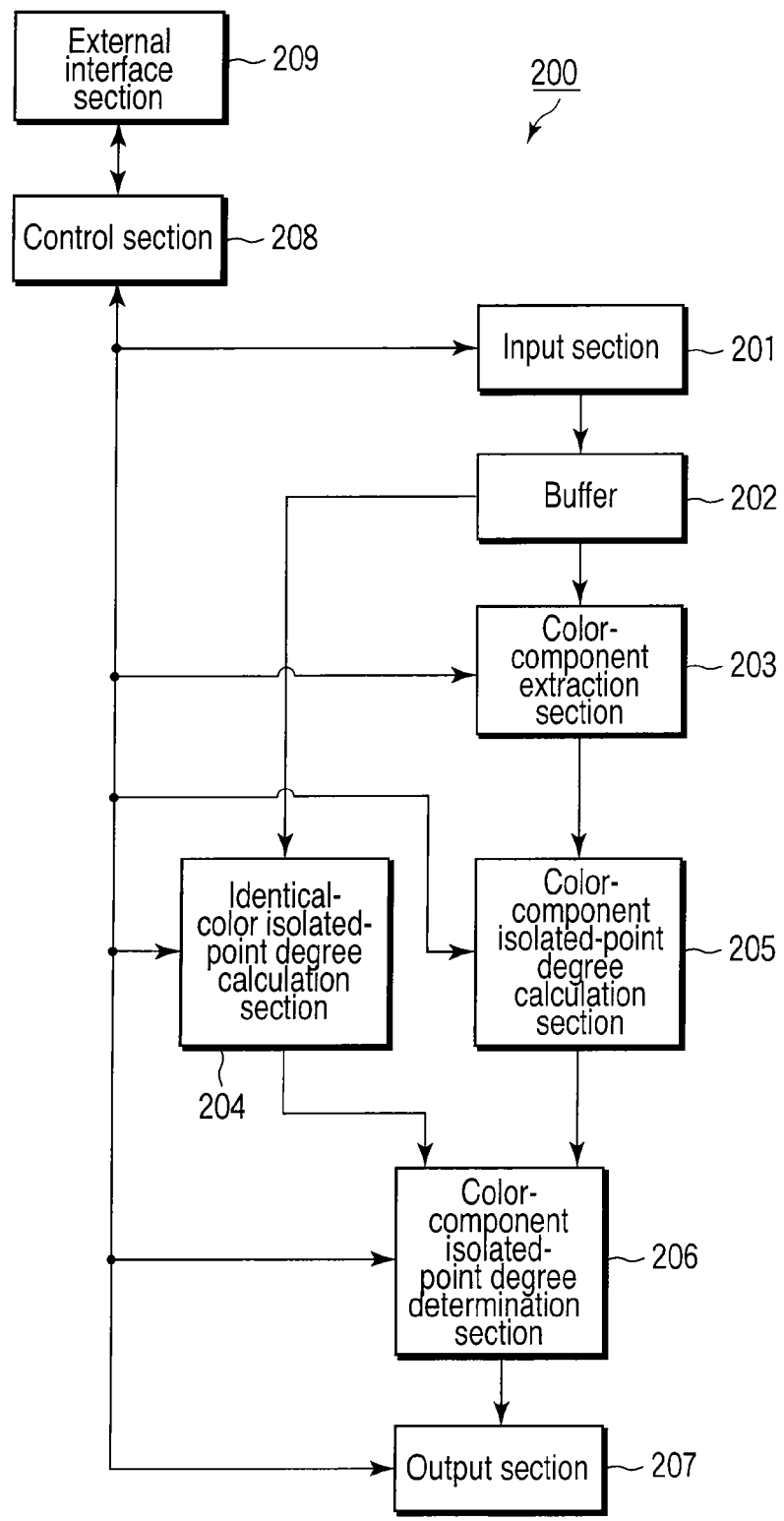
FIG. 8 is a block diagram showing the circuit configuration of an image processing device according to a second embodiment of the present invention.

FIG. 8 is a block diagram showing the circuit configuration of an image processing device 200 according to this embodiment. In FIG. 8, a digitized color image signal from an imaging system (not shown) is input to an input section 201. Here, the color image signal to be input is assumed to be a single-chip image constituted of red, green, and blue of the Bayer arrangement. The image signal input to the input section 201 is sent to a color-component extraction section 203 and identical-color isolated-point degree calculation section 204 through a buffer 202.

The color-component extraction section 203 extracts a color component on the basis of the image signal from the buffer 202, and outputs the extracted color-component image to a color-component isolated-point degree calculation section 205.

The color-component isolated-point degree calculation section 205 calculates the isolated-point degree from the color-component image output from the color-component extraction section 203, and outputs the calculated isolated-point degree to a color-component isolated-point degree determination section 206.

On the other hand, the identical-color isolated-point degree calculation section 204 calculates the isolated-point degree on the basis of the image signal from the buffer 202, and outputs the calculated isolated-point degree to the color-component isolated-point degree determination section 206.

The color-component isolated-point degree determination section 206 determines the isolated-point degree on the basis of the isolated-point degree calculated by the color-component isolated-point degree calculation section 205, and isolated-point degree calculated by the identical-color isolated-point degree calculation section 204, and outputs the determination result to an output section 207 as isolated-point determination information.

The output section 207 outputs the isolated-point determination information from the color-component isolated-point degree determination section 206 to, for example, a defective pixel correction section (not shown), whereby the section 207 causes the defective pixel correction section to subject the image signal to defective pixel correction of the isolated point.

A control section 208 carries out operation control of each circuit in a unifying manner. The control section 208 is constituted of, for example, a one-chip microcomputer or the like, and is bidirectionally connected to the input section 201, color-component extraction section 203, identical-color isolated-point degree calculation section 204, color-component isolated-point degree calculation section 205, color-component isolated-point degree determination section 206, and output section 207.

Furthermore, an external interface section 209 is bidirectionally connected to the control section 208. The external interface section 209 includes a power-supply switch, and interface mechanism configured to carry out switching of threshold setting which are not shown.

The control section 208 executes in advance setting of input conditions such as the image size, threshold, and the like through the external interface section 209 before inputting a color image signal to the input section 201.

Next, an operation of the embodiment will be described below.

The color image signal input to the input section 201 is sent to the color-component extraction section 203 and identical-color isolated-point degree calculation section 204 through the buffer 202.

An example of color-component extraction at the color-component extraction section 203 will be described below by using FIGS. 9 to 13D.

Figure 9:
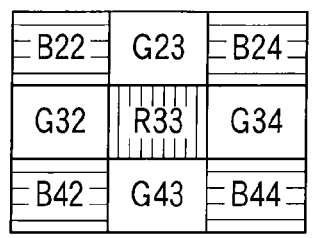
FIG. 9 is a view exemplifying the pixel configuration of the RGB primary-color system Bayer arrangement.
Figure 10A:
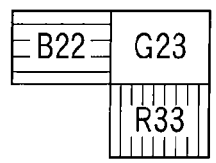
FIG. 10A is a view showing a selection pattern of peripheral pixels for a target pixel according to the second embodiment.
Figure 10B:
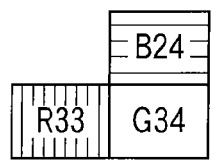
FIG. 10B is a view showing a selection pattern of peripheral pixels for a target pixel according to the second embodiment.
Figure 10C:
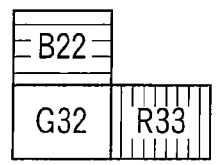
FIG. 10C is a view showing a selection pattern of peripheral pixels for a target pixel according to the second embodiment.
Figure 10D:
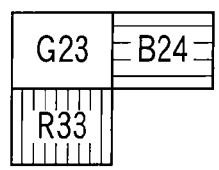
FIG. 10D is a view showing a selection pattern of peripheral pixels for a target pixel according to the second embodiment.
Figure 10E:
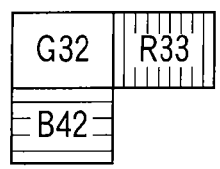
FIG. 10E is a view showing a selection pattern of peripheral pixels for a target pixel according to the second embodiment.
Figure 10F:
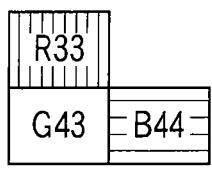
FIG. 10F is a view showing a selection pattern of peripheral pixels for a target pixel according to the second embodiment.
Figure 10G:
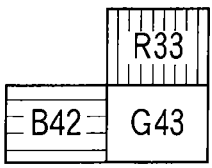
FIG. 10G is a view showing a selection pattern of peripheral pixels for a target pixel according to the second embodiment.
Figure 13A:
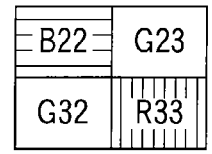
FIG. 13A is a view showing a selection pattern of peripheral pixels for a target pixel according to the second embodiment.
Figure 13B:
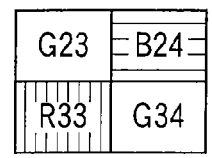
FIG. 13B is a view showing a selection pattern of peripheral pixels for a target pixel according to the second embodiment.
Figure 13C:
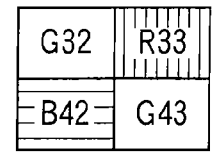
FIG. 13C is a view showing a selection pattern of peripheral pixels for a target pixel according to the second embodiment.
Figure 13D:
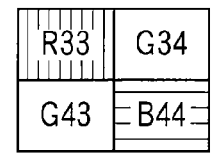
FIG. 13D is a view showing a selection pattern of peripheral pixels for a target pixel according to the second embodiment.

FIG. 9 shows pixels of the Bayer arrangement. A single-chip solid-state image sensing device (not shown) in the imaging system has a color filter of the Bayer arrangement, and hence such a color image signal is input to the input section 201.

The color-component extraction section 203 firstly makes the red pixel or blue pixel the target pixel, and selects peripheral pixels of the target pixel. By taking the case where the target pixel is a red pixel as an example, the case where the target pixel is R33 in FIG. 9 will be described below.

The color-component extraction section 203 makes three pixels including the target pixel, a green pixel adjacent to the target pixel, and blue pixel further adjacent thereto one set, and then selects peripheral pixels.

FIGS. 10A to 10H enumerate selection patterns of peripheral pixels for one target pixel, and eight sets of peripheral pixels can be selected for one target pixel as shown in FIGS. 10A to 10H.

Next, the green pixel is made the target pixel, and peripheral pixels of the target pixel are selected. In FIG. 11, the case where the target pixel is made G43 is shown.

FIGS. 12A to 12D enumerate selection patterns of peripheral pixels of the case where the green pixel is made the target pixel, and three pixels including the target pixel, and a red pixel and blue pixel which are adjacent to the target pixel are made one set, and four sets of peripheral pixels can be selected for one target pixel as shown in FIGS. 12A to 12D.

Subsequently, color components are extracted for each set. With respect to the case where the target pixel is a red pixel or blue pixel, a description will be given by taking FIG. 10A as an example. The color-component extraction section 203 extracts a red component, and cyan component when the target pixel is a red pixel. Further, the color-component extraction section 203 extracts a blue component, and yellow component when the target pixel is a blue pixel.

Here, the following relationships are obtained.

red component=min{pixel value of $R33$−pixel value of $G23$, pixel value of $R33$−pixel value of $B22$} cyan component=min{pixel value of $G23$−pixel value of $R33$, pixel value of $B22$−pixel value of $R33$} blue component=min{pixel value of $B22$−pixel value of $G23$, pixel value of $B22$−pixel value of $R33$} yellow component=min{pixel value of $G23$−pixel value of $B22$, pixel value of $R33$−pixel value of $B22$}

Further, the case where the target pixel is a green pixel will be described by taking the set of FIG. 12A as an example. The color-component extraction section 203 extracts a green component and magenta component.

Here, the following relationships are obtained.

green component=min{pixel value of $G43$−pixel value of $R33$, pixel value of $G43$−pixel value of $B42$} magenta component=min{pixel value of $R33$−pixel value of $G43$, pixel value of $B42$−pixel value of $G43$}

Furthermore, another example of the case where the target pixel of the color-component extraction at the color-component extraction section 203 is a red pixel or blue pixel will be described below by using FIGS. 9, and 13A to 13D.

In selecting peripheral pixels, a block corresponding to a total of four pixels constituted of two pixels in the longitudinal direction×two pixels in the lateral direction including the target pixel is made one set. As shown in FIGS. 13A to 13D, four sets can be selected for one target pixel.

Subsequently, color components are extracted for each set. A description will be given by taking FIG. 13A as an example. Like the previous example, when the target pixel is a red pixel, the color-component extraction section 203 extracts a red component, and cyan component. Further, when the target pixel is a blue pixel, the color-component extraction section 203 extracts a blue component, and yellow component.

Here, the following relationships are established.

Pixel value of green=(pixel value of $G23$+pixel value of $G32$)/2 red component=min{pixel value of $R33$−pixel value of green, pixel value of $R33$−pixel value $B22$} cyan component=min{pixel value of green−pixel value of $R33$, pixel value of $B22$−pixel value of $R33$} blue component=min{pixel value of $B22$−pixel value of green, pixel value of $B22$−pixel value of $R33$} yellow component=min{pixel value of green−pixel value of $B22$, pixel value of $R33$−pixel value of $B22$}

The color-component isolated-point degree calculation section 205 positioned in the subsequent stage of the color-component extraction section 203 calculates the isolated-point degree on the basis of the results of the color components extracted by the color-component extraction section 203. The color-component isolated-point degree calculation section 205 calculates, for each color component, the rank order value from the color components of the eight or four peripheral pixels extracted by the color-component extraction section 203 for one target pixel.

For example, when the target pixel is a red pixel, eight red components and eight cyan components are extracted by the color-component extraction section 203 from eight sets of peripheral pixels. The color-component isolated-point degree calculation section 205 sums the four absolute values described previously corresponding to half the number of the absolute values of the eight red components from the smallest absolute value. Likewise, the color-component isolated-point degree calculation section 205 sums the four absolute values described previously from the smallest absolute value of the absolute values of the eight cyan components. Further, smaller one of the two summed values is made the isolated-point degree, and is output to the color-component isolated-point degree determination section 206.

When the target pixel is a blue pixel, the color-component isolated-point degree calculation section 205 carries out calculation with respect to the blue components and yellow components in the same manner, and makes the resultant value the isolated-point degree, and outputs the isolated-point degree to the color-component isolated-point degree determination section 206.

Further, when the target pixel is a green pixel, the color-component extraction section 203 extracts four green components and four magenta components from four sets of peripheral pixels. Accordingly, the color-component isolated-point degree calculation section 205 sums the two absolute values corresponding to half the number of the absolute values of the four green components from the smallest absolute value. Likewise, the color-component isolated-point degree calculation section 205 sums the two absolute values of the four magenta components from the smallest absolute value. Further, smaller one of the two summed values is made the isolated-point degree, and is output to the color-component isolated-point degree determination section 206.

Next, calculation of the isolated-point degree at the identical-color isolated-point degree calculation section 204 on the other side will be described below.

The identical-color isolated-point degree calculation section 204 firstly selects peripheral pixels for the target pixel in the same manner as the first isolated-point candidate detection section 103. Selection of peripheral pixels is carried out with respect to eight identical-color pixels each separated from the target pixel by a pixel in the upward, downward, rightward, leftward, and diagonal directions. Further, it is also possible to make eight pixels adjacent to the target pixel the peripheral pixels.

The identical-color isolated-point degree calculation section 204 calculates absolute values of differences between the target pixel and peripheral pixels, sums the absolute values corresponding to half the number of the peripheral pixels from the smallest absolute value of the calculated difference, makes the summed value the isolated-point degree of the target pixel, and outputs the value to the color-component isolated-point degree determination section 206.

When the isolated-point degree calculated by the color-component isolated-point degree calculation section 205 is greater than or equal to a predetermined threshold, and isolated-point degree calculated by the identical-color isolated-point degree calculation section 204 is greater than or equal to the predetermined threshold, the color-component isolated-point degree determination section 206 determines that the target pixel is an isolated point. The result including information on determining whether or not the target pixel is the isolated point is output to the output section 207.

Further, as another example, the color-component isolated-point degree determination section 206 may output the total of the isolated-point degree calculated by the color-component isolated-point degree calculation section 205, and isolated-point degree calculated by the identical-color isolated-point degree calculation section 204 to the output section 207 as the final isolated-point degree.

Furthermore, as still another example, when the isolated-point degree calculated by the color-component isolated-point degree calculation section 205 is greater than or equal to a predetermined threshold, the color-component isolated-point degree determination section 206 may output the isolated-point degree calculated by the identical-color isolated-point degree calculation section 204 to the output section 207 as the final isolated-point degree.

The isolated-point determination information output from the output section 207 may be stored in a memory area in the subsequent stage (not shown), or further, it is also possible to utilize the information for subjecting the image signal to defective pixel correction to be carried out by the defective pixel correction section.

Figure 14:
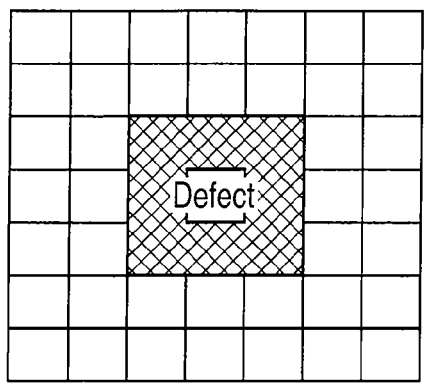
FIG. 14 is a view showing a defective pixel according to the second embodiment.

FIG. 14 exemplifies such defective pixel correction. As shown in FIG. 14, it is assumed that there is a pixel which is a defective pixel, and is white at all times in the center of a black area of three pixels in the longitudinal direction×three pixels in the lateral direction, and the other pixels around the black area are gray. It is also assumed that in the input signal, each of the color components has an 8-bit gradation (0 to 255). It is tried to carry out defective pixel detection while assuming the central pixel to be a red pixel and target pixel.

When it is tried to detect a defective pixel by the conventional method in which identical-color pixels are made the peripheral pixels, all the peripheral pixels are gray, and hence it is thought to be very difficult to determine that the central target pixel is a defective pixel, although the difficulty depends on the determination conditions.

On the other hand, in this embodiment, the isolated-point degree is determined not only by making the identical-color pixels the peripheral pixels, but also by making the pixels adjacent to the target pixel the peripheral pixels as shown in FIGS. 10A to 10H and 13A to 13D.

When the pixels adjacent to the target pixel are made the peripheral pixels, here, red components and cyan components are calculated from one set of three pixels shown in each of FIGS. 10A to 10H. For example, the following conditions are set.

red component $(A) = 255$ red component $(B) = 255$ $\vdots$ $\vdots$ red component $(H) = 255$ cyan component $(A) = -255$ cyan component $(B) = -255$

⋮

⋮ cyan component (H) = −255

Then, when four absolute values of the red components are summed from the smallest absolute value, 1020 is obtained. Likewise, regarding the cyan components, the resultant value becomes 1020, and thus the isolated-point degree becomes 1020 which is the largest value.

Subsequently, when the isolated-point degree is calculated by making the identical-color pixels the peripheral pixels, and by using the rank order, the following is obtained.

|−128|×4=512

The peripheral pixels are determined not only from the identical-color pixels separate from the peripheral pixels, but also from the pixels adjacent to the peripheral pixels, whereby it is possible to enhance the accuracy of the isolated-point determination although the accuracy also depends on the setting of the threshold of the isolated-point degree determination condition.

It should be noted that in this embodiment, although the description has been given on the assumption that the input signal is an RGB primary-color system image signal, the present invention is not limited to this, and other signals may be used, for example, a complementary color system image signal may also be used.

Further, in the above description, although the isolated-position degree has been calculated by using the rank order, calculation of the isolated-position degree is not limited to this and, other indicators for measuring the isolated-point degree may also be used, for example, the average value of the peripheral pixels may be made the isolated-point degree.

Furthermore, in the above embodiment, although the description has been given on the assumption that the processing is realized by hardware as shown in FIG. 8, the image processing can also be realized by software, and hence the processing contents will be described below.

Figure 15:
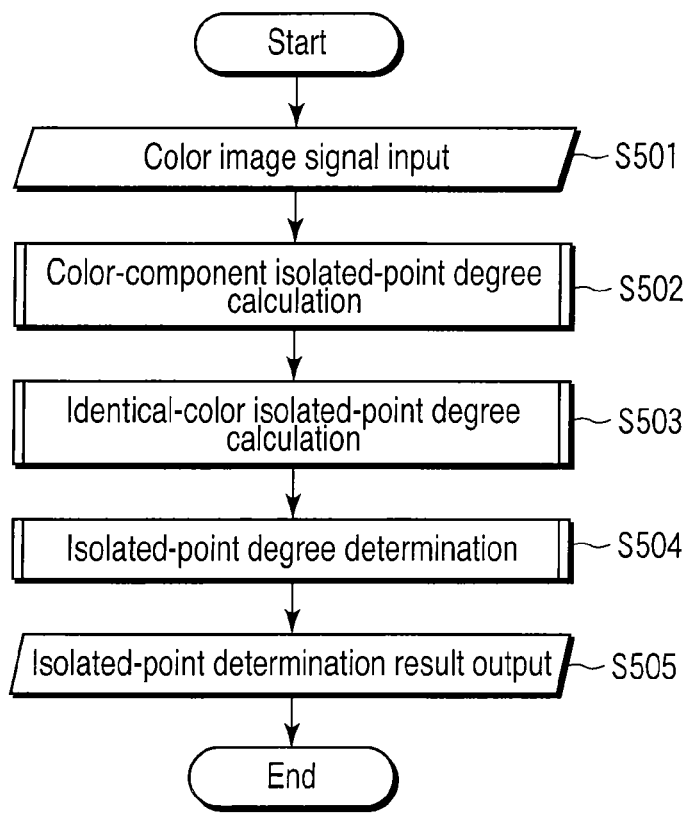
FIG. 15 is a flowchart showing a main routine of the image processing according the second embodiment.

FIG. 15 shows the contents of the main routine of the software processing to be executed by using a data processor or the like for image processing generally called an image engine or the like.

In FIG. 15, first, when a digital color image signal and header information are input (step S501), the image signal and information are temporarily held, thereafter color components are extracted from the input image signal, and then the isolated-point degree is calculated (step S502).

Figure 16:
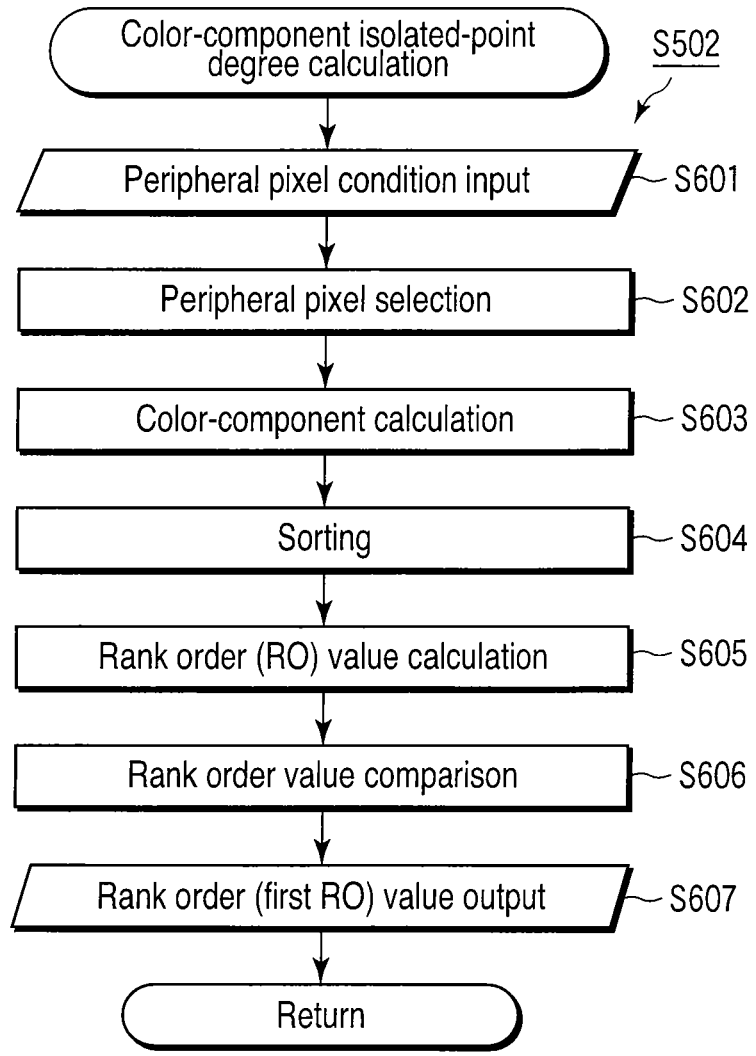
FIG. 16 is a flowchart showing the processing contents of a color-component isolated-point degree calculation subroutine of FIG. 15 according to the second embodiment.

FIG. 16 shows a subroutine associated with isolated-point degree calculation of the color components.

At the beginning, when a condition for setting the peripheral pixels is input (step S601), peripheral pixels for the target pixel, and the pattern are selected on the basis of the input peripheral pixel setting condition (step S602).

Then, each color component is calculated from the target pixel, selected peripheral pixels, and pattern (step S603), and the calculated color-component values are sorted (step S604).

Thereafter, the color-component values are summed with respect to half the number of the color-component values from the smallest sorted color-component value as the rank order value, that is, when the peripheral pixels selected for the target pixel are eight pixels, the color-component values are summed with respect to four pixels, and the resultant value is made the rank order value (step S605).

Furthermore, the rank order values of the color components calculated in step S605 are compared with each other (step S606), the minimum value of the rank order values is selected to obtain the first rank order value (first RO value), and the first rank order value is output as the parameter value of the color-component isolated-point degree (step S607). Actually, with respect to each of all the target pixels constituting the input image signal, the processing of calculation of the color-component isolated-point degree is executed in the same manner, whereby the image signal corresponding to one frame is processed. Thus, after the calculation of the color-component isolated-point degree is ended, the flow returns to the main routine of FIG. 15.

In the main routine of FIG. 15, the identical-color isolated-point degree is calculated from the image signal input in step S501 (step S503).

Figure 17:
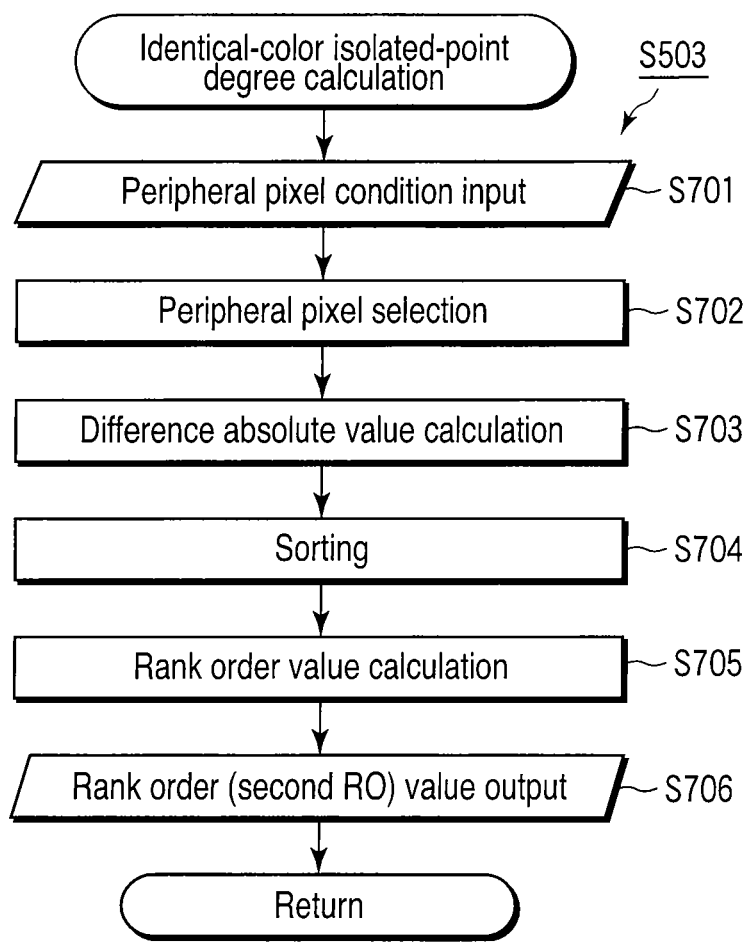
FIG. 17 is a flowchart showing the processing contents of an identical-color isolated-point degree calculation subroutine of FIG. 15 according to the second embodiment.

FIG. 17 shows a subroutine associated with the identical-color isolated-point degree calculation.

At the beginning, when a condition for setting the peripheral pixels is input (step S701), peripheral pixels for the target pixel are selected on the basis of the input peripheral pixel setting condition (step S702).

Then, the absolute values of differences between the target pixel and selected peripheral pixels are calculated (step S703), and the calculated difference absolute values are sorted (step S704).

Thereafter, the difference absolute values are summed with respect to half the number of the difference absolute values from the smallest sorted difference absolute value as the rank order value, that is, when the peripheral pixels selected for the target pixel are eight pixels, the color-component values are summed with respect to four pixels, and the resultant value is made the rank order value (step S705).

Furthermore, the rank order value of the difference absolute values calculated in step S705 is made the second rank order value (second RO value), and is output as the parameter value of the identical-color isolated-point degree (step S706).

Actually, with respect to each of all the target pixels constituting the input image signal, the calculation processing of the identical-color isolated-point degree is executed in the same manner, whereby the image signal corresponding to one frame is processed. Thus, after the calculation of the identical-color isolated-point degree is ended, the flow returns to the main routine of FIG. 15.

In FIG. 15, the isolated-point degree is determined on the basis of the color-component isolated-point degree calculated in step S502, and identical-color isolated-point degree calculated in step S503 (step S504).

FIG. 18 shows a subroutine associated with the isolated-point degree determination.

At the beginning, after a threshold or the like used as a condition for carrying out the isolated-point degree determination is input (step S801), the sum of the first RO value and second RO value is calculated (step S802).

Subsequently, it is determined whether or not the calculated sum is larger than the threshold input in step S801 (step S803).

Here, if it is determined that the calculated sum is larger than the threshold, then both the color-component isolated-point degree and identical-color isolated-point degree are high, and hence it is determined that the target pixel is an isolated point (step S804).

Further, if it is determined in step S803 that the sum of the first RO value and second RO value is less than or equal to the threshold, then it is thought that the isolated-point degree is not so high, and the determination indicating that the target pixel is the isolated point is not carried out.

Actually, with respect to each of all the target pixels constituting the input image signal, the isolated-point degree determination is carried out in the same manner, whereby the image signal corresponding to one frame is processed. Thus, after the isolated-point degree determination is ended, the flow returns to the main routine of FIG. 15.

In the main routine of FIG. 15, information on the positions of the target pixels for which it is determined in step S504 that they are isolated points is collectively output to a circuit (not shown) of the next stage (step S505), and thus the image processing by the software according to this embodiment is terminated.

As described above in detail, in this embodiment, peripheral pixels of the target pixel are selected from the input image signal, color components are extracted from the selected peripheral pixels, and the isolated-point candidate is detected, whereas the isolated-point candidate is detected also from the identical-color adjacent pixels of the input image signal, and the final isolated-point degree is determined from the plurality of detected isolated-point candidates. As a result of this, the isolated-point degree is determined in a unifying manner by detecting the isolated-point candidates from a plurality of indicators, and hence it is possible to carry out isolated-point detection with a higher degree of accuracy.

Further, in this embodiment, an image signal of the primary-color system Bayer arrangement constituted of red, green, and blue is input, and hence it is possible to adapt the embodiment as it is to the input image signal frequently used in a digital camera or the like.

Furthermore, in this embodiment, when the target pixel is a red pixel or blue pixel, three pixels including the target pixel, a green pixel adjacent to the target pixel, and pixel adjacent to the target pixel, and having a color different from the target pixel are selected, then color components are extracted from the selected three pixels, and hence it is possible to extract more suitable color components by extracting the color components on the basis of the pixels adjacent to the target pixel than the case where the color components are extracted from pixels separate from the target pixel.

Furthermore, in this embodiment, when the target pixel is a green pixel, a total of three pixels including the target pixel, a red pixel and blue pixel which are adjacent to the target pixel are selected, and color components are extracted from the selected three pixels. As a result of this, it is possible to extract more suitable color components by extracting the color components on the basis of the pixels adjacent to the target pixel than the case where the color components are extracted from pixels separate from the target pixel.

Further, in this embodiment, when the target pixel is a red pixel or blue pixel, a block of a total of four pixels including the target pixel, and constituted of two pixels in the longitudinal direction×two pixels in the lateral direction is selected, and color components are extracted from the selected four pixels. As a result of this, it is possible to extract more suitable color components by extracting the color components on the basis of the pixels adjacent to the target pixel than the case where the color components are extracted from pixels separate from the target pixel.

Furthermore, in this embodiment, although the rank order is used as the parameter value for detecting the isolated-point candidate of the color component, by using the rank order indicating the isolated-point degree, it is possible to carry out isolated-point detection of a high degree of accuracy.

Furthermore, in this embodiment, although the rank order is used as the parameter value for detecting the identical-color isolated-point candidate, by using the rank order indicating the isolated-point degree, it is possible to carry out isolated-point detection of a high degree of accuracy.

Further, in this embodiment, when the parameter value calculated by extracting color components is greater than or equal to a certain threshold, and parameter value calculated from the original input image signal is also greater than or equal to the certain threshold, it is determined that the position of the target pixel is an isolated point. As a result of this, by determining the isolated-point degree in consideration of a plurality of parameter values, it is possible to carry out isolated-point detection of a higher degree of accuracy.

Furthermore, in this embodiment, by totaling the plurality of calculated parameter values, the isolated-point degrees are set like consecutive numbers, and hence when correction is carried out after the isolated-point detection, it is possible to carry out correction of a high degree of flexibility.

Furthermore, in this embodiment, when the parameter value calculated by extracting color components is greater than or equal to a certain threshold, the isolated-point degrees are set like consecutive numbers by the parameter values calculated from the original input image signal, and hence when correction is carried out after the isolated-point detection, it is possible to carry out correction of a high degree of flexibility based on the information of the original input image signal.

It should be noted that although in each of the first and second embodiments, the case where the present invention is applied to an image processing device incorporated in a digital still camera has been described, the present invention is not limited to this, and can be applied to more common image processing for subjecting image data acquired by some means to image processing, such as application software for retouch in the same manner.

Moreover, the present invention is not limited to the embodiments described previously, and can be variously modified in the implementation stage within the scope not deviating from the gist of the invention. Further, the functions to be carried out in the above-mentioned embodiments may be appropriately combined within the limits of the possibility to be implemented. Various stages are included in the embodiments described above, and by appropriately combining a plurality of constituent elements, various inventions can be extracted. For example, even when some constituent elements are deleted from all the constituent elements shown in the embodiments, if an advantage can be obtained, the configuration from which the constituent elements are deleted can be extracted as an invention.

What is claimed is:

1. An image processing device comprising:
a plurality of isolated-point candidate detection sections, each being configured to calculate a parameter value used for detecting an isolated-point candidate in a color image signal in a first color space; and
an isolated-point degree determination section configured to determine an isolated-point degree of a target pixel on the basis of parameter values calculated by the plurality of isolated-point candidate detection sections,
wherein:
one of the plurality of isolated-point candidate detection sections calculates a first parameter value with respect to the target pixel of the color image signal based on at least a difference between a pixel value of the target pixel and a pixel value of a peripheral pixel of the target pixel,
at least one of the plurality of isolated-point candidate detection sections is provided with a color-space conversion section configured to color-convert a first plurality of color signals constituting the color image signal in the first color space, into a second plurality of color signals in a second color space, and calculates a second parameter value with respect to the target pixel based on at least a difference between a pixel value of one of the second plurality of color signals, corresponding to the target pixel, and a pixel value of another one of the second plurality; and the isolated-point degree determination section determines the isolated-point degree of the target pixel on the basis of the first parameter value, and at least one of the second parameter values.

2. The image processing device according to claim 1, wherein when, of the plurality of parameter values, the first parameter value is greater than or equal to a predetermined threshold, and at least one of the second parameter values is greater than or equal to the predetermined threshold, the isolated-point degree determination section determines that the target pixel is an isolated point.

3. The image processing device according to claim 1, wherein the isolated-point degree determination section totals the plurality of parameter values, and sets the isolated-point degree on the basis of an amount of the totaled value.

4. The image processing device according to claim 1, wherein the isolated-point degree determination section determines the isolated-point degree on the basis of a first parameter value of a predetermined pixel, and a parameter value of the color signal among the second parameter values, the parameter value being produced by using the predetermined pixel.

5. The image processing device according to claim 1, wherein
at least one of the plurality of isolated-point candidate detection sections is provided with a color-space conversion section configured to combine a plurality of signals constituting the color image signal and convert the combined signals into a plurality of color signals on defined color space, and calculates a parameter value used for detecting an isolated-point candidate from a near-field region of a target pixel of the converted color signal.

6. The image processing device according to claim 5, wherein the color-space conversion section combines a plurality of signals constituting the color image signal together, and converts the combined signals into a luminance signal and a chrominance signal.

7. The image processing device according to claim 5, wherein a parameter value calculated by at least one of the isolated-point candidate detection sections is a difference between an average value of a near-field region of a target pixel of the converted color signal and the target pixel.

8. The image processing device according to claim 1, wherein one of the plurality of isolated-point candidate detection sections calculates a parameter value used for detecting an isolated-point candidate from a near-field region of a target pixel of the image signal.

9. The image processing device according to claim 8, wherein the parameter value calculated by at least one of the isolated-point candidate detection sections is a difference between an average value of a near-field region of a target pixel of the image signal and the target pixel.

10. The image processing device according to claim 1, wherein the parameter value calculated by the isolated-point candidate detection section is a rank order.

* * * * *